United States Patent [19]
Yang

[11] Patent Number: 5,147,979
[45] Date of Patent: Sep. 15, 1992

[54] THREADLESS FLOOR ELECTRIC WIRE JUNCTION BOX WITH WATER-PROOF PROTECTION

[76] Inventor: Chin-Hui Yang, 4F, No. 2, Lane 409, Chung Cheng Rd., Hsin Tien City, Taipei Hsien, Taiwan

[21] Appl. No.: 626,143
[22] Filed: Dec. 12, 1990
[51] Int. Cl.$^5$ .............................................. H02G 3/28
[52] U.S. Cl. ...................................................... 174/48
[58] Field of Search ....................... 174/48, 49; 52/221

[56] References Cited

U.S. PATENT DOCUMENTS

| | | | |
|---|---|---|---|
| 1,982,464 | 11/1934 | Buchanan | 174/48 |
| 3,173,227 | 3/1965 | Clark | 174/48 |
| 3,565,276 | 2/1971 | O'Brian | 174/48 X |
| 3,873,136 | 3/1975 | Curry | 174/48 X |

Primary Examiner—Leo P. Picard
Assistant Examiner—David A. Tone
Attorney, Agent, or Firm—Varndell Legal Group

[57] ABSTRACT

Threadless floor electric wire junction box with embedded in the concrete floor for distribution of electric wire through a wiring conduit which has a bolt hole for guiding electric wire. The bolt hole is blocked with a plug assembly and sealed with a gasket ring. The plug assembly comprises at least a tubular plug having an inner thread for mounting a cap through screw joint and sealed with a gasket ring. The cap can be conveniently removed from the tubular plug so that electric wire can be guided out of the wiring conduit for installation of socket power. A screw power. A screw pipe coupling is attached to the plug assembly and sealed with a gasket ring for connecting two tubular plugs together so as to increase the height of the plug assembly.

2 Claims, 3 Drawing Sheets

THREADLESS FLOOR ELECTRIC WIRE JUNCTION BOX WITH WATER-PROOF PROTECTION

BACKGROUND OF THE INVENTION

The present invention relates to threadless floor electric wire junction box with water-proof protection and, more particularly, to threadless floor electric wire junction box with water-proof protection in the concrete floor of a building for distribution of electric wire through a wiring conduit, in which the position of wiring outlet can be adjusted to a desired height.

In building construction, a threadless floor electric wire junction box is generally embedded in the concrete floor for distribution of electric wire through wiring conduits of which each has a hole blocked with a plug which can be opened for passing therethrough of electric wire from a floor wiring box for socket power installation.

FIG. 1 illustrates a wiring conduit according to the prior art, which has a stub tube for mounting a plug through a screw joint. Because the stub tube projects from the top edge of the wiring conduit, it may be damaged or deformed easily during transportation. Further, after a plug is fastened in the stub tube through screw joint, water or moisture may permeate through the gap therebetween, causing an electrical leakage problem.

FIG. 2 illustrates another type of wiring conduit according to the prior art, which has a round hole with two opposite notches made thereon at the top for mounting a plug. Because the round hole is formed through a punching process, high precision is difficult to achieve. Therefore, a gap can not be completely eliminated after a plug is fastened in the round hole, i.e. water or moisture may permeate into the wiring conduit to cause an electrical leakage problem.

SUMMARY OF THE INVENTION

The present invention has been accomplished of the above circumstances in view. It is one object of the present invention to provide a floor wiring conduit for a floor wiring box for distribution of electric wire, which can protect against permeation of water. It is another object of the present invention to provide a floor wiring conduit for a floor wiring box for distribution of electric wire, which has an wiring outlet that can be conveniently adjusted to a desired height.

According to one aspect of the present invention, a floor wiring conduit which is embedded in a concrete floor and connected to a floor wiring box for distribution of electric wire has a bolt hole for mounting a plug assembly through a screw joint and sealed with a gasket ring, which plug assembly is covered with a cap which is fastened in said plug assembly through a screw joint and sealed with a gasket ring.

According to another aspect of the present invention, the plug assembly has two elongated ribs longitudinally disposed at two opposite locations, and the cap has eight projecting edges equidistantly disposed around the periphery thereof. Through the ribs or the projecting edges, the plug assembly or the cap can be conveniently rotated during installation.

According to still another aspect of the present invention, a screw pipe coupling is used to connect two tubular plugs through screw joint so as to increase the total height of the plug assembly in the wiring conduit.

DETAILED DESCRIPTION OF THE PREFERRED EMBODIMENT

Figure 3:
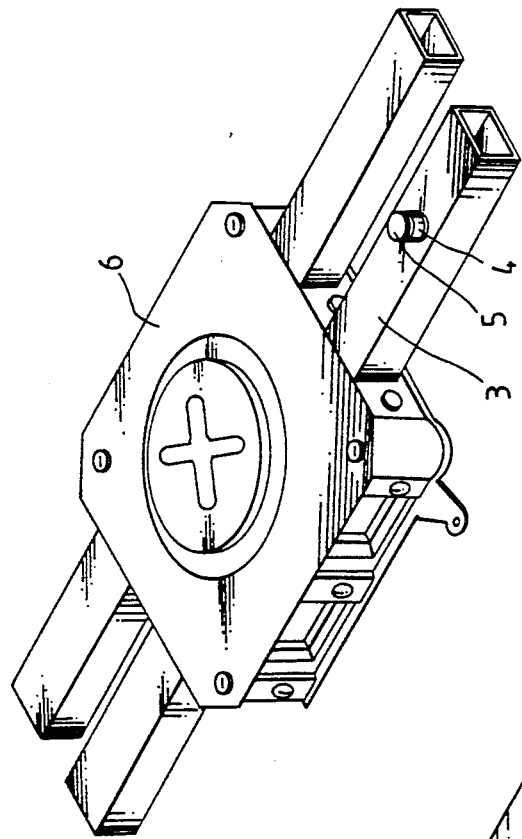
FIG. 3 illustrates a floor wiring box constructed according to the present invention.
Figure 2:
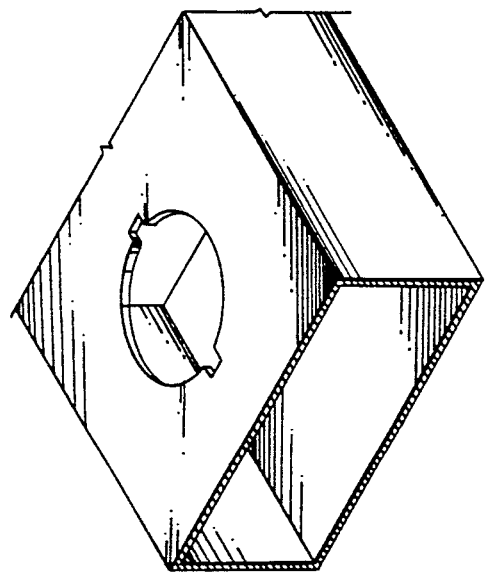
FIGS. 1 and 2 illustrates two differnt structures of wiring conduit according to the prior art.
Figure 1:
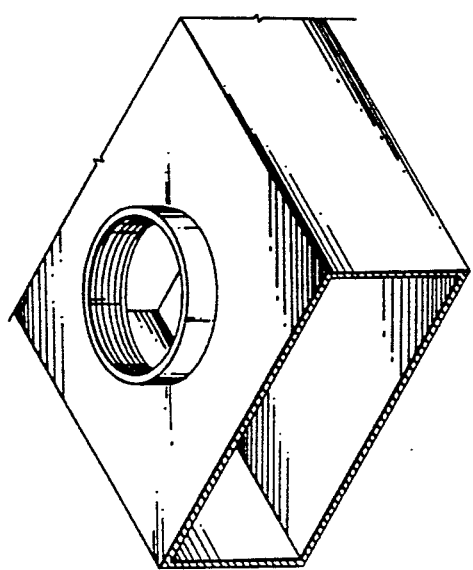
Figure 4:
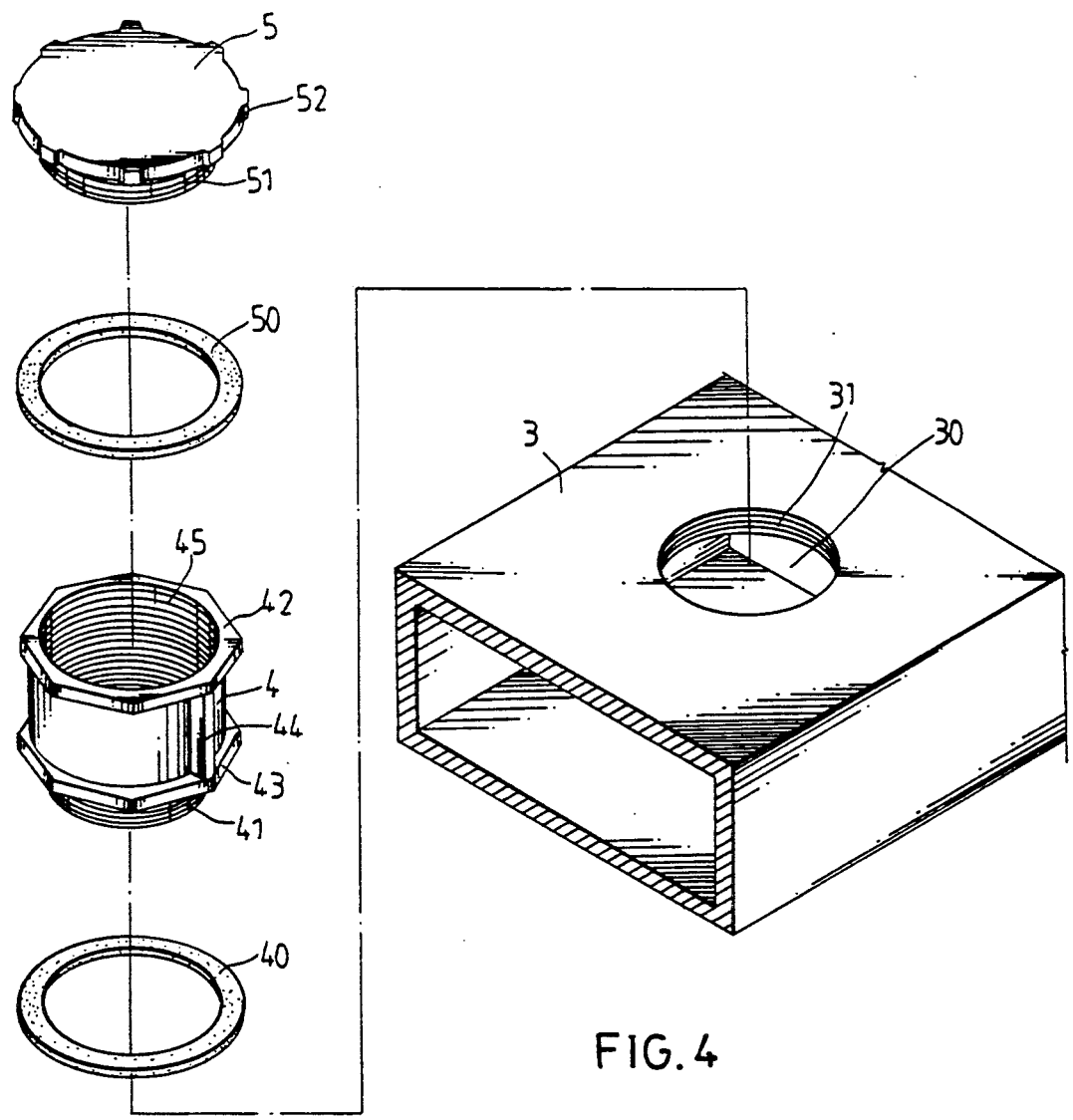
FIG. 4 is a perspective dismantled view of the present invention.
Figure 5:
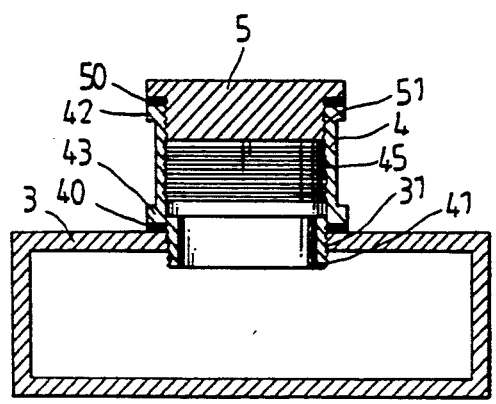
FIG. 5 is a sectional assembly view of the present invention.

Referring to FIGS. 3 and 4, a wiring conduit 3 is fastened in a wiring box 6 and embedded in the concrete floor of a building for distribution of electric wire. A bolt hole 30 which has an inner thread 31 is made on the wiring conduit 3 at the top for mounting a plug 4 which is covered with a cap 5 and disposed out of the concrete floor. By removing the cap 5 from the plug 4, electric wire from the wiring box 6 can be connected to a plug socket for supplying electricity to any electric appliances connected thereto. The plug 4 comprises a first octagonal flange 42 at the top, a second octagonal flange 43 at the middle, two unitary ribs 44 longitudinally disposed between said first and second octagonal flanges 42 and 43 at two opposite locations, a connecting end 41 at the bottom which has an outer thread for connection with the inner thread 31 of the bolt hole 30, and an inner thread 45 for mounting the cap 5 through screw joint. Through the ribs 44, the plug 4 can be conveniently rotated to fasten in the bolt hole 30 of the wire conduit 3. The cap 5 has a connecting end 51 which has outer thread 51 for connection with the inner thread 45 of the plug 4. There are eight projecting edges 52 equidistantly made around the periphery of the cap and respectively disposed in a horizontal position. Through the projecting edges 52, the cap 5 can be conveniently rotated to fasten in or remove from the plug 4. Before fastening in the bolt hole 30 of the wire conduit 3, a gasket ring 40 is mounted on the connecting end 41 of the plug. In the same manner, before fastening in the inner thread 45 of the plug 4, a gasket ring 50 is mounted on the connecting end 51 of the cap 5. Therefore, after the plug 4 and the cap 5 are respectively fastened in the bolt hole 30 of the wire conduit 3 or the inner thread 45 of the plug 4, water or moisture is prohibited from entering the wire conduit 3 through the bolt hole 30.

Figure 6:
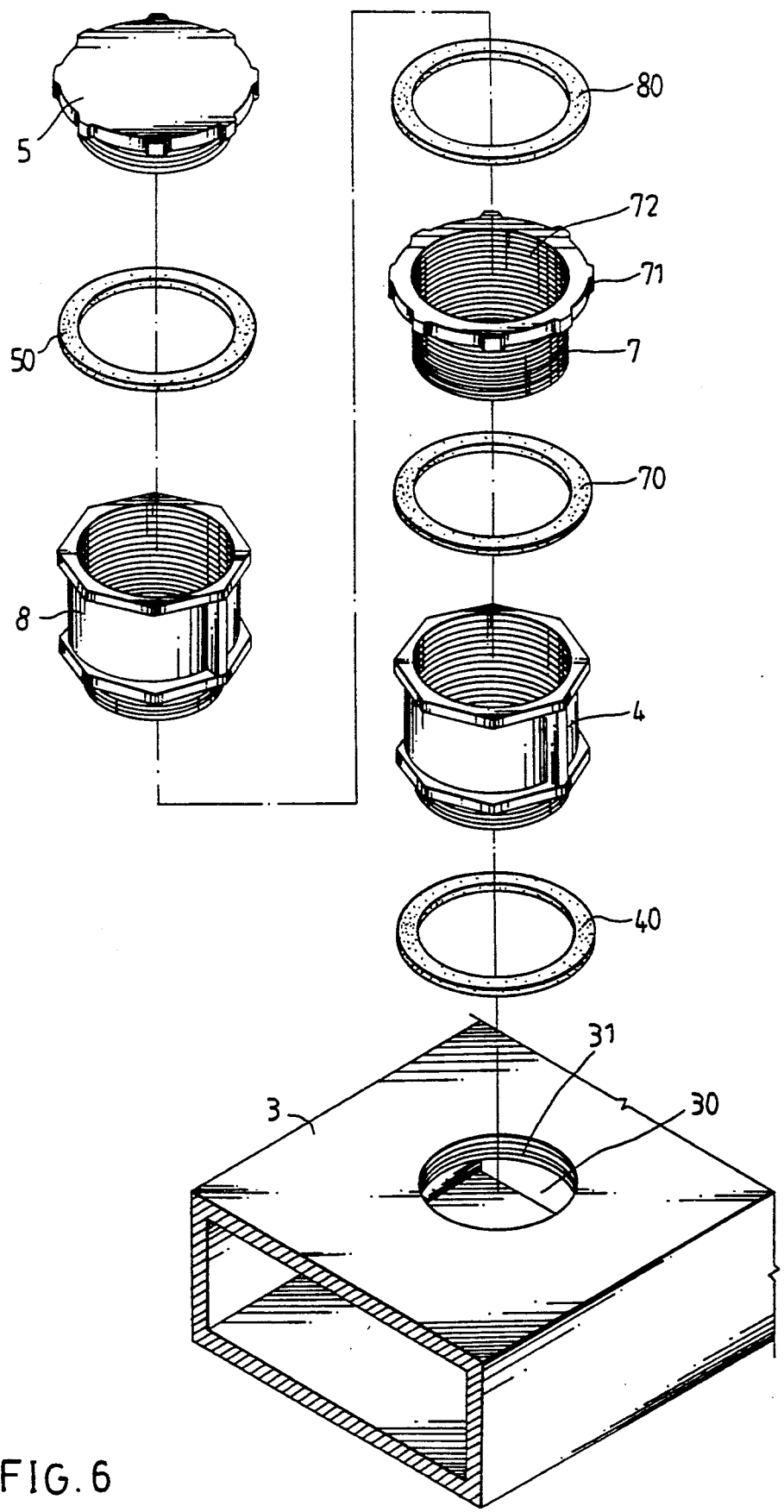
FIG. 6 illustrates an alternate form of the present invention.

Referring to FIG. 6, a screw pipe coupling 7 may be used to connect two plugs 4, 8 together, so as to extend the total height from the wiring conduit 3. As illustrated, a screw pipe coupling 7 has a top flange 71, which has eight projecting edges equidistantly made around the periphery thereof and through which a screw pipe coupling 7 can be conveniently rotated for fastening, an outer thread for connection with the inner thread 45 of the plug 4 or the inner thread 31 of the bolt hole 30, and an inner thread 72 for fastening the connecting end 41 of the plug 8. Before mounting, a gasket ring 70 is mounted on the screw pipe coupling 7. Therefore, the gap between the plug 4 and the screw pipe coupling 7 is sealed. By means of aforesaid arrangement, a plurality of plugs 4, 8 can be connected together and fastened in the wire conduit 3 to seal the bolt hole 30.

I claim:

1. A floor electric wire junction box with water-proof protection for distribution of electric wire comprising a threadless wiring box having at least one wire conduit attached thereto, said wiring conduit having a bolt hole, a plug assembly fastened in said bolt hole, and a gasket ring interposed between said bolt hole and said plug assembly; said plug assembly including at least one tubular plug covered with a cap; said tubular plug having a top with a first polygonal flange, a middle with a second polygonal flange, two unitary ribs longitudinally disposed between said first and second polygonal flanges at opposite locations on said tubular plug, a bottom with a connecting end for fastening in said bolt hole through a screw joint, and an inner threaded portion; said cap having an outer threaded portion for screwing in said inner thread portion of said tubular plug, a top surface covering said first polygonal flange of said tubular plug; said top surface having a plurality of projecting edges respectively spaced from one another at equal intervals; and a gasket ring interposed between said tubular plug and said cap.

2. The floor electric wire junction box according to claim 1, wherein said plug assembly includes two of said tubular plugs interconnected by a screw pipe coupling; said screw pipe coupling having a top with a flange having a plurality of projecting edges respectively spaced from one another at equal intervals, an outer threaded portion screwed into said inner threaded portion of one of said two tubular plugs, an inner threaded portion screwed onto said bottom of another of said two tubular plugs, and two gaskets respectively interposed between said two tubular plugs and said screw pipe.

* * * * *